US007937699B2

(12) United States Patent
Schneider (10) Patent No.: US 7,937,699 B2
(45) Date of Patent: May 3, 2011

(54) UNATTENDED UPGRADE FOR A NETWORK APPLIANCE

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 914 days.

(21) Appl. No.: 11/897,733

(22) Filed: Aug. 31, 2007

(65) Prior Publication Data

US 2009/0064127 A1 Mar. 5, 2009

(51) Int. Cl.
*G06F 9/44* (2006.01)
*G06F 9/445* (2006.01)
*G06F 15/177* (2006.01)

(52) U.S. Cl. .................. 717/173; 717/178; 709/221
(58) Field of Classification Search .............. 717/173
See application file for complete search history.

(56) References Cited

U.S. PATENT DOCUMENTS

| 5,950,010 | A  | * | 9/1999  | Hesse et al. ................ 717/178 |
| 6,266,809 | B1 | * | 7/2001  | Craig et al. ................. 717/173 |
| 7,145,682 | B2 | * | 12/2006 | Boldon ....................... 717/168 |
| 7,356,679 | B1 | * | 4/2008  | Le et al. ..................... 717/176 |
| 7,543,118 | B1 | * | 6/2009  | Chen et al. .................. 717/168 |
| 7,624,086 | B2 | * | 11/2009 | Keith, Jr. .................... 717/174 |
| 2002/0124245 | A1 | * | 9/2002 | Maddux et al. ............... 717/176 |
| 2004/0019823 | A1 | * | 1/2004 | Gere ............................ 714/13 |
| 2004/0215755 | A1 | * | 10/2004 | O'Neill ....................... 717/170 |

OTHER PUBLICATIONS

Arora et al., "An Empirical Analysis of Software Vendors' Patching Behavoir: Impact of Vulnerability Disclosure"; Carnegie Mellon University, 2006, 33pg.*
Balani et al., "Multi-level Software Reconfiguration for Sensor Networks"; ACM, 2006, 10pg.*
Dunkels et al., "Run-Time Dynamic Linking for Reprogramming Wireless Sensor Networks"; ACM, 2006, 14pg.*
Shogan et al., "Compact Binaries with Code Compression in a Software Dynamic Translator"; IEEE, 2004, 6pg.*
Red Hat Command Center 3.18, Check Reference, Red Hat, Inc., 2007, 178 pages.
Red Hat Command Center, Users Guide 3.18, Red Hat, Inc., 2007, 318 pages.
Red Hat Command Center, Release Notes 3.18, Red Hat, Inc., 2007, 7 pages.
Red Hat Command Center 3.18, Setup and Installation Guide, Red Hat, Inc., 2007, 33 pages.

* cited by examiner

*Primary Examiner* — Wei Y Zhen
*Assistant Examiner* — Ryan D Coyer
(74) *Attorney, Agent, or Firm* — Blakely, Sokoloff, Taylor & Zafman LLP (57) ABSTRACT

A method and apparatus for upgrading a network appliance. In one embodiment, the method includes determining that an upgrade of the network appliance is needed using versioning information of the network appliance and upgrade versioning information, and determining, based on upgrade criteria, whether the network appliance should be upgraded using a full install image. If the network appliance should be upgraded using the full install image, the full install image is downloaded to the network appliance.

22 Claims, 6 Drawing Sheets

UNATTENDED UPGRADE FOR A NETWORK APPLIANCE

TECHNICAL FIELD

Embodiments of the present invention relate to managing upgrades of network appliances, and more specifically to automatically upgrading network devices and appliances.

BACKGROUND

Networked computers are used to transmit and fetch information to and from local sources (e.g., computers used in a business) and remote sources (e.g., enterprise services offered over the internet). To ensure privacy and security during communication between networked computers, authentication and verification mechanisms may be used. Thus, the authentication and verification mechanisms can be used to establish a trusted session between a server and client. The trusted session can be used to manage upgrades for network appliances so that malicious software is less likely to be installed during an upgrade.

Upgrading of system software and applications for many network appliances is often performed using an upgrade patch. Often the upgrades are performed using a sequential series of upgrade patches. For example, a network appliance might be powered down for a long period of time (such as months or perhaps even years) and might not be aware of the patches as they become available. In some cases, software configurations of the network appliances are so out-of-date, that the conventional mechanism for providing a sequential series of upgrade patches cannot be safely applied. In such cases, applying the long series of upgrade patches can cause the network appliance to hang during the upgrade process, and require manual intervention by skilled technicians in order to resolve the problem.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for upgrading software for network appliances. In one embodiment, a server determines that a network appliance should be upgraded using versioning information of a network appliance and upgrade versioning information. The server then uses an upgrade criteria to determine whether to upgrade the network appliance using a full install image. The upgrade criteria may based on, for example, a comparison between the network appliance versioning information and an upgrade threshold, or some other factors. If the determination is positive, the server downloads the full install image to the network appliance.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The description that follows details a system, apparatus, and method for automatically upgrading network appliances by determining whether to upgrade a network appliance using a full install image, or, to upgrade using a sequential series of patches. The determination can be made by retrieving versioning information of software within a network appliance and comparing the versioning information to a list of available upgrades. Upgrading using the full install image can be automatically determined by comparing the network appliance versioning information with an upgrade criteria so that upgrading network appliances with lengthy sequential series of patches (which can often fail to upgrade safely) can be avoided.

Figure 1A:
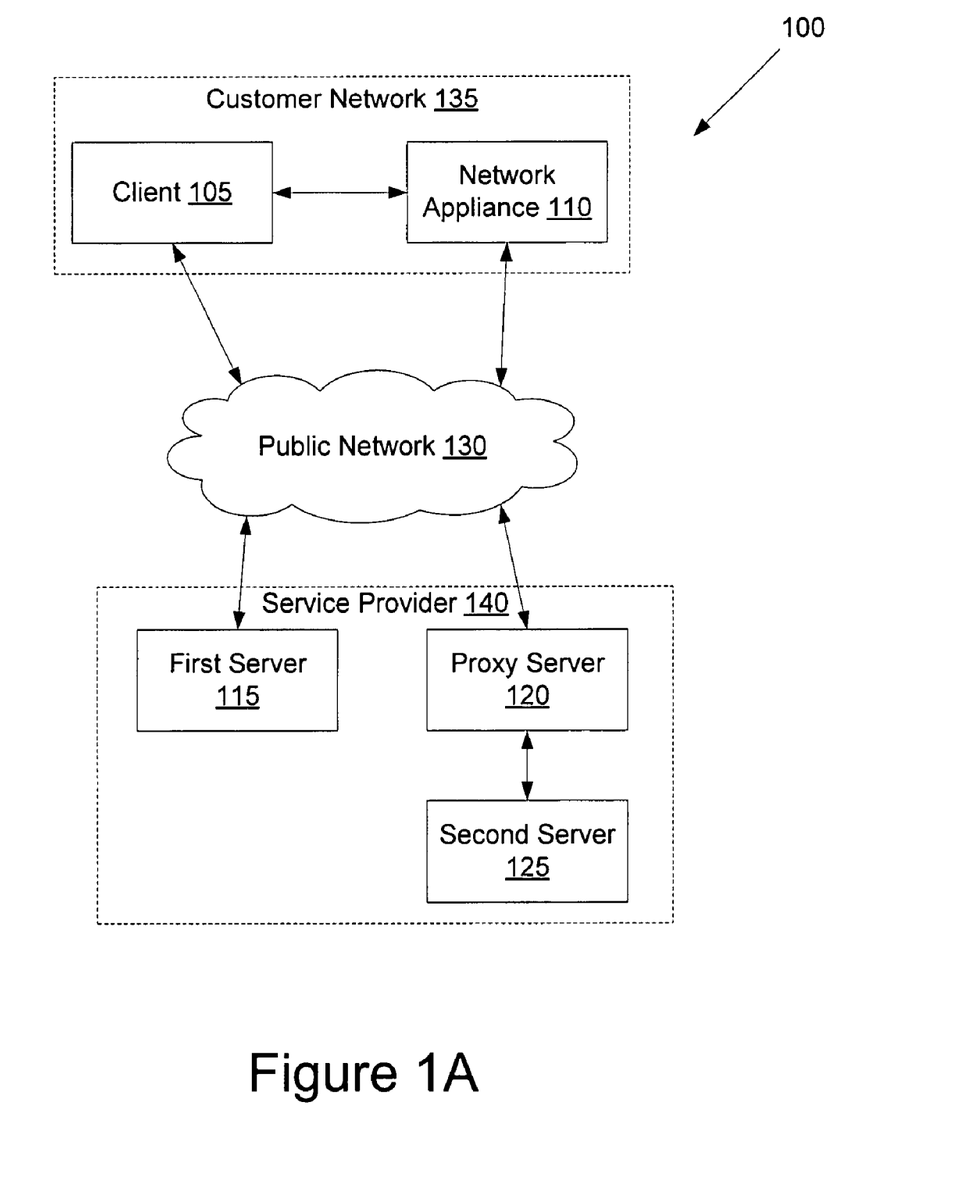
FIG. 1A illustrates an exemplary network architecture in which embodiments of the present invention may operate.

FIG. 1A illustrates an exemplary network architecture 100 in which embodiments of the present invention may operate. The network architecture 100 may include a service provider 140 connected with a customer network 135 (e.g., a local area network (LAN), wide area network (WAN), intranet, etc.) over a public network 130 (e.g., the internet). Alternatively, the customer network 135 may be connected with the service provider 140 via a private network (e.g., an intranet, virtual private network (VPN), etc.).

Referring to FIG. 1A, the customer network 135 may represent a network of an enterprise and may include such devices as desktop computers, laptop computers, network printers, switches, routers, gateways, firewalls, or any other devices having a network address. In one embodiment, the customer network 135 also includes a client 105 and a network appliance 110. Client 105 may be a device operated by an IT administrator or some other user. The network appliance 110 may be a device that is configurable over a network. The client 105 and the network appliance 110 may each be a computing device such as, for example, a desktop computer, laptop computer, server, etc.

Network architecture 100 may enable service provider 140 to provide services targeted to, and/or dependent on, specific devices (e.g., network appliance 110) of customer network 135. To provide such services, it may be necessary for the specific device to authenticate itself to service provider 140. Such authentication may be achieved using an identity certificate. In one embodiment, the identity certificate is generated as part of activating and/or configuring a new device. Alternatively, generation of the identity certificate may occur separately from device activation and configuration.

In one embodiment, the network appliance 110 is configured to perform a network related function (e.g., network monitoring) upon connection with the customer network 135. In a further embodiment, the network related function is automatically initiated once the network appliance receives an identity certificate and/or configuration information. In one embodiment, a user request for activation of network appliance 110, for the identity certificate and/or for configuration information may originate from the client 105. Alternatively, requests for activation, for the identity certificate (e.g., a CSR) and/or for configuration information may automatically be generated by the network appliance 110.

Service provider 140 provides one or more services to customer network 135. In one embodiment, service provider 140 uses the network appliance 110 to collect information about the customer network 135 and devices on the customer network 135. The service provider 140 then analyzes this information, and presents the analysis to a user such as an IT administrator (e.g., via client 105). Alternatively, the service provider 140 may provide other services, such as banking services, database management services, etc. The service provider 140 includes one or more servers (e.g., first server 115, proxy server 120, and second server 125). In one embodiment, the service provider 140 includes a separate and distinct first server 115, proxy server 120 and second server 125. In another embodiment, the first server 115 and second server 125 are co-located on a computing device, and no proxy server 120 is present. Alternatively, other server configurations may be implemented (e.g., service provider 140 may include more or fewer servers, which may have redundant or different functionality).

First server 115 may be a front end server that provides an interface to client 105 of customer network 135. Through the first server 115, users of customer network 135 may request data, initiate actions, receive information, etc. Network appliance 110 may also communicate with first server 115, for example, to request a service, initiate an action, report data, etc. In one embodiment, first server 115 is a web application server that provides a web application interface accessible to client 105 via a web browser.

Second server 125 may be a back end server that communicates with the network appliance 110 of customer network 135 to send and/or receive such data as identity certificate information, network status updates, transactions, etc. Second server 125 may also communicate data to and/or from client 105. In one embodiment, second server 125 communicates with the network appliance 110 and/or client 105 through proxy server 120. Proxy server 120 receives transmissions and, if appropriate, forwards them to second server 125. Alternatively, no proxy server 120 may be present, or multiple proxy servers may be used.

In one embodiment, second server 124 controls upgrade of the network appliance 110. In particular, if the second server 124 determines that network appliance software should be upgraded using a full install image (e.g., if the network appliance software is too out-of-date use to safely upgrade using a sequential series of upgrade patches or no such upgrade patch exists for the network appliance), the second server 124 downloads the latest full install image to the network appliance 110 to let the network appliance 110 rebuild itself. As will be explained in greater detail below, the upgrade process performed under control of the second server 124 is completely automated. The users may not even be aware of the upgrade process, except for not being able to use the network appliance 110 while it is rebuilding itself.

Figure 1B:
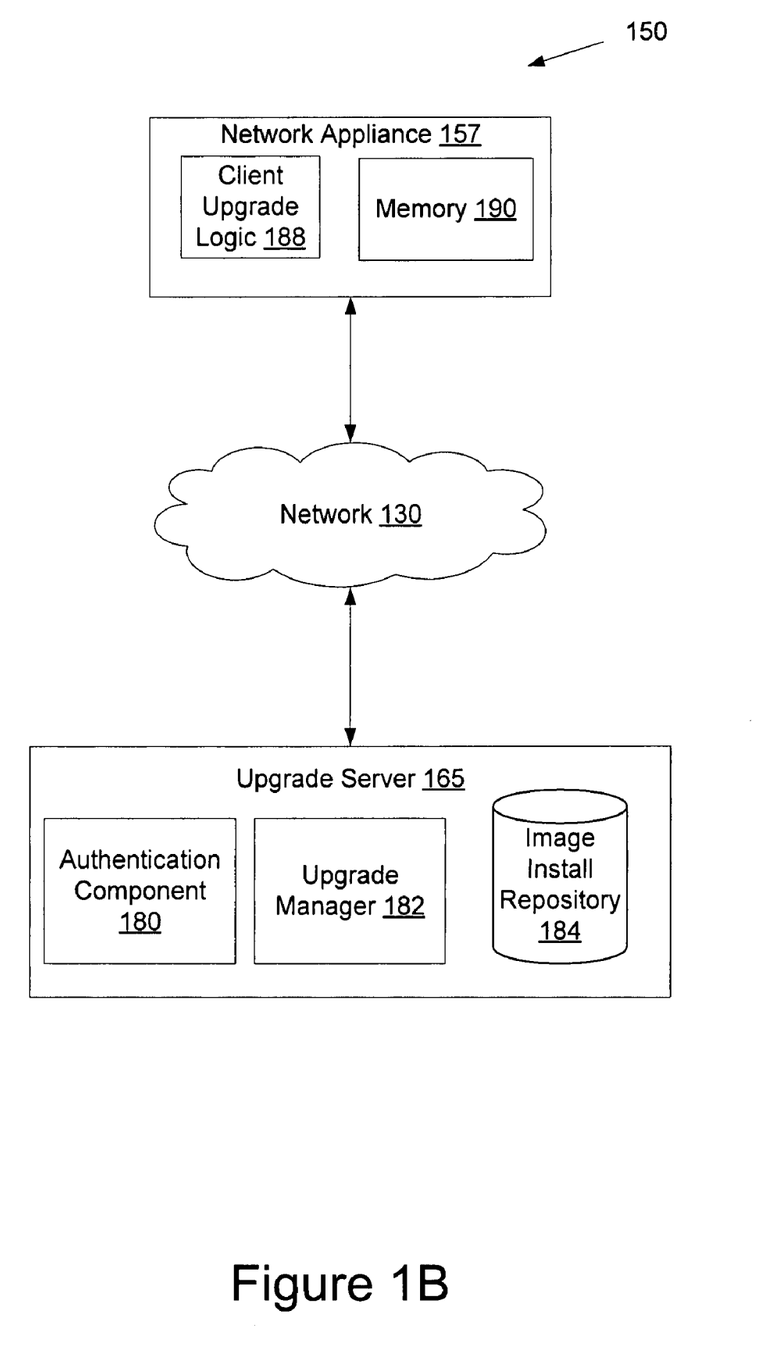
FIG. 1B illustrates another exemplary network architecture, in which further embodiments of the present invention may operate.

FIG. 1B illustrates another exemplary network architecture 150, in which further embodiments of the present invention may operate. The network architecture 150 may include upgrade server 165 hosted by a service provider that is connected with a network appliance 157 over a network 130 (e.g., the internet and/or a private network). The network appliance 157 may be a computing device such as, for example, a desktop computer, laptop computer, server, etc.

In one embodiment, network appliance 157 may include client upgrade logic 188 and secondary memory storage 190. Client upgrade logic 188 may communicate with the upgrade server 165 to upgrade the network appliance 157. In particular, client upgrade logic 188 provides network appliance versioning and/or configuration information to the upgrade server 165 which decides whether to use a sequential series of upgrade patches or a full install for the upgrade of the network appliance 157.

Secondary memory storage 190 can be used by the client upgrade logic 188 to store information relating to upgrading the software of the network appliance 157. For example, a full install image for the network appliance 157 can be downloaded from upgrade server 165 and stored in secondary memory storage 190. Likewise, network appliance 157 can store configuration information (such as hardware configuration information) that can be used in conjunction with a full install image to successfully upgrade the network appliance 157.

Upgrade server 165 may be a computing device such as, for example, a desktop computer, laptop computer, server, etc. In one embodiment, upgrade server 165 may include authentication component 180, upgrade manager 182, and image install repository 184. Authentication component 180 can be used to authenticate, for example, a network appliance 157 that may need upgrading. When authentication of the network appliance 157 is performed, upgrading of software on the network appliance can be accomplished (as described further below).

Upgrade manager 182 may be used to manage upgrading of network appliance 157. In one embodiment, the upgrade manager may poll the network appliance 157 for version levels of software to determine if (and how) an upgrade should be performed. In another embodiment, the upgrade manager 182 can locally maintain a list of the version levels of software and "push" the changes to the network appliance 157 as the changes become available.

Image install repository 184 can be used to store upgrades for network appliances. For example, image install repository 184 can be used to store a full image (or various revisions of full images) of software to be downloaded to the network appliance. Optionally, upgrade patches (such as a sequential series of upgrade patches) can be stored in (or in association with) the image install repository 184.

Figure 2:
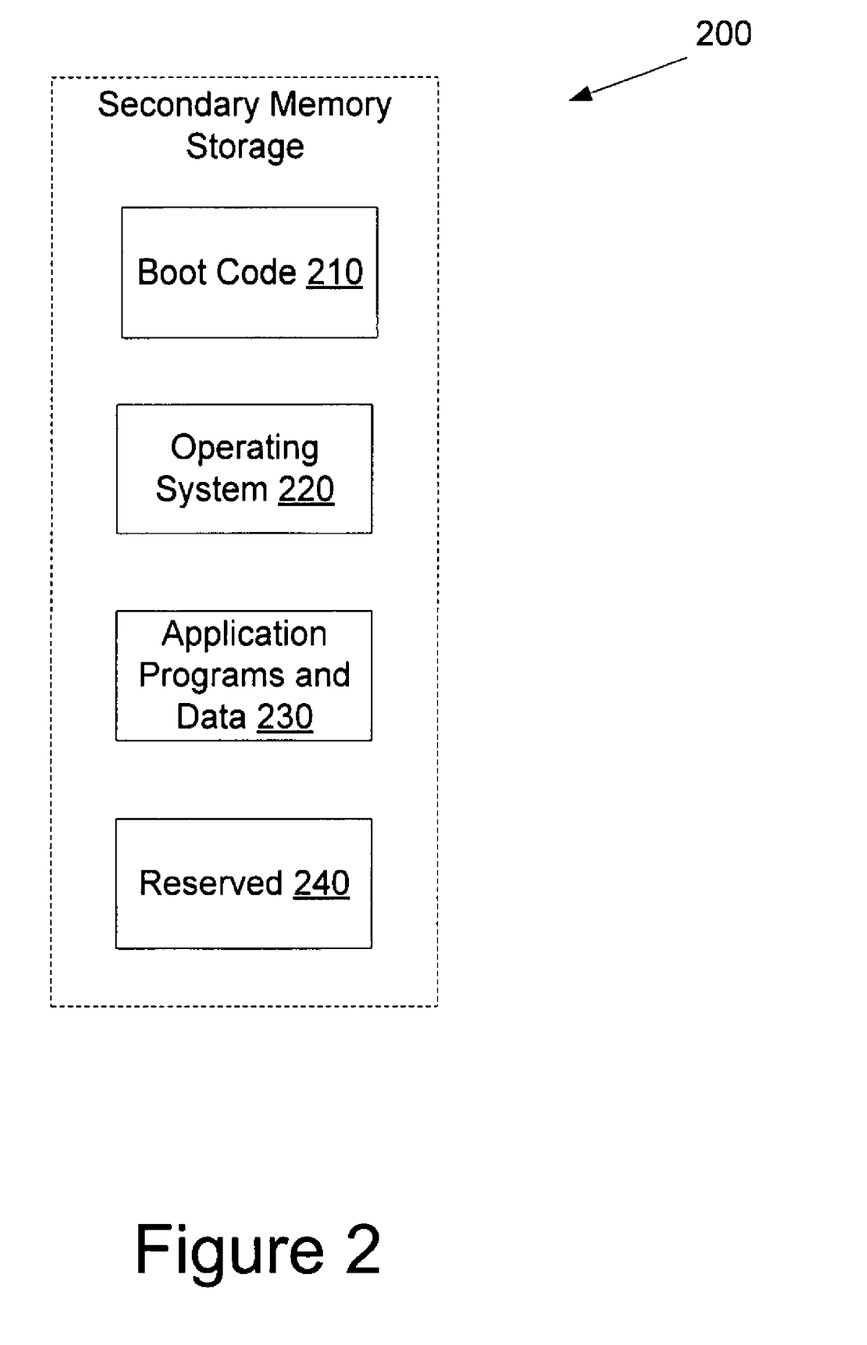
FIG. 2 is a schematic diagram illustrating a secondary memory storage device used for upgrading a network appliance, in accordance with one embodiment of the present invention.

FIG. 2 is a schematic diagram illustrating one embodiment of a memory device used for upgrading a network appliance. Secondary memory storage 200 is typically a bootable memory device such as a hard drive. Secondary memory storage 200 is usually divided into sections of reserved memory areas. The reserved memory areas can be demarcated as logical and/or physical partitions of a disk drive, memory banks, BLOBs (binary large objects) and the like.

Section 210 is reserved for use by a boot code routine, such as code contained within a boot sector of a hard drive. In various embodiments, a processor fetches a boot vector at boot time, which directs the processor program counter to execute a BIOS service to load the boot code routine from secondary memory storage 200 into a local (fast) memory. The boot code routine is executed by the processor to, for example, select and/or load an operating system.

Section 220 is reserved for storing the operating system code. The operating system is typically loaded into the processor local memory as described above, and then executed. Any portion of the operating system code can be combined with section 210, although typically the operating segment code remains segregated from the boot code routine.

Section 230 is reserved for use by application programs and data storage. The application programs typically run under the direction of the operating system and require memory in secondary memory storage 200 for storing data that is used by the application programs. Any portion of section 230 can be combined with section 220.

Section 240 is a section of secondary memory storage 200 that is reserved for special and/or future uses. For example, section 240 can be used as scratchpad memory for loading large segments of data and/or code. Additionally, section 240 can be used as an upgrade staging area, such as when the operating system or other software is upgraded as described below. In another example, section 240 can be used by the operating system and/or application programs.

Figure 3A:
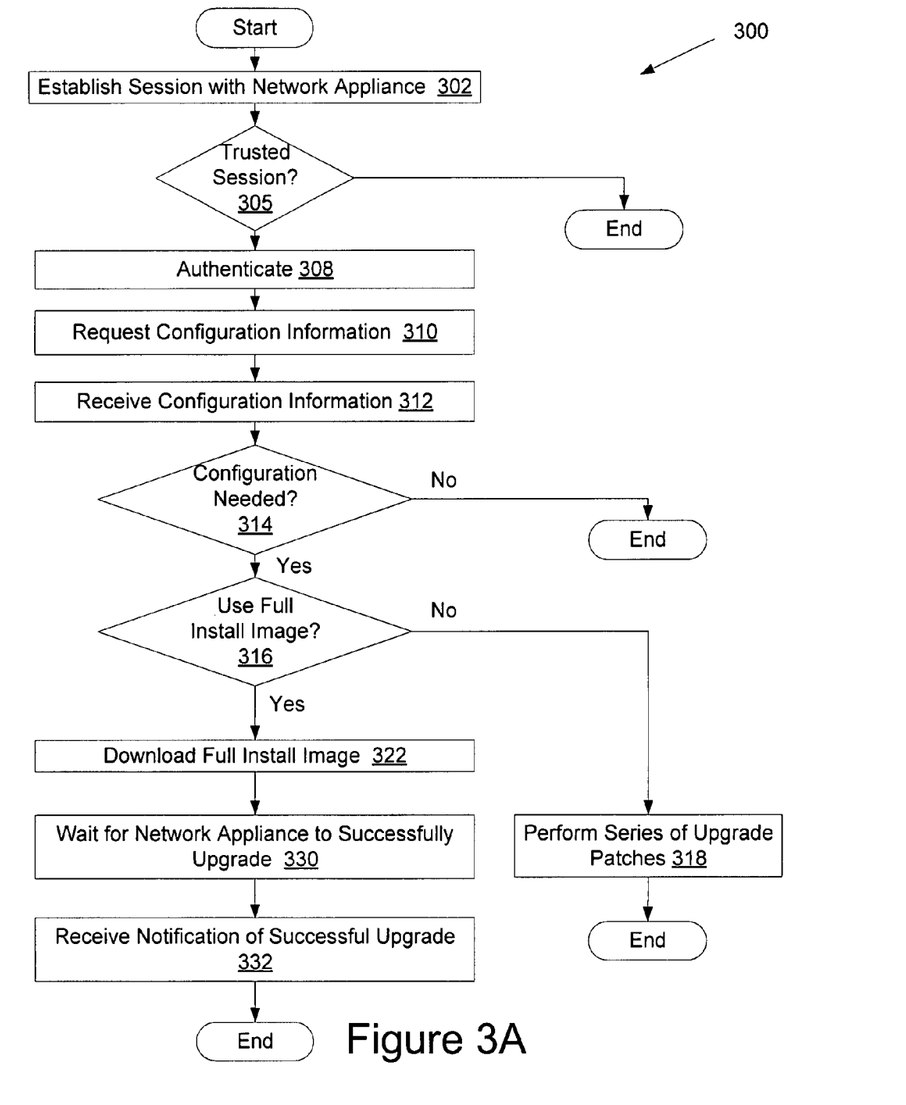
FIG. 3A is a flow diagram illustrating a method for activating a network appliance using a network service provider, in accordance with one embodiment of the present invention.

FIG. 3A is a flow diagram illustrating one embodiment of a server-based method 300 for upgrading a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a service provider, such as upgrade server 165 of FIG. 1B.

Referring to FIG. 3A, method 300 begins with processing logic establishing a session with a network appliance (block 302). At block 305, processing logic optionally determines whether to trust the network appliance. For example, the network appliance can provide acceptable credentials or authentication information to the service provider. Alternatively, the service provider can authenticate the network appliance by recognizing an IP address associated with communications from the network appliance. If the credentials or authentication information are acceptable, then the method proceeds to block 308, and the network appliance is authenticated. If no credentials were provided, or if unacceptable credentials were provided, then the method ends.

At block 310, the service provider sends a request for configuration information. The request can be generated by an upgrade manager of the service provider, for example. The request for configuration information typically requests information concerning software versioning information, which can be used to determine whether and how to upgrade the network appliance as discussed further below. The request may also (or may not) identify specific software components, operating system, and/or a predetermined software component of the network appliance about which configuration information is desired. (The configuration information of, for example, the set of installed software programs and versioning information can also be used to automatically determine whether new utilities and/or programs should be downloaded to the network appliance.)

At block 312, the service provider receives the configuration information. The supplied configuration information typically includes version numbers and/or times-last-updated of software components of the network appliance that are to be upgraded. Other information in the reply may or may not include identifying information about the network appliance (e.g., a MAC address), configuration information (e.g., information on any state associated with the network appliance hardware that is needed for proper functioning), or credential information for the network appliance.

At block 314, a determination is made as to whether an upgrade is needed for the network appliance. In one embodiment, the network service provider uses information contained within the configuration request to determine whether a particular upgrade is needed. In an alternative embodiment, the network service provider consults a table of last-known configurations for the network appliance. In yet another alternative embodiment, the network service provider transmits a list of potential upgrades to the network appliance (e.g., containing dates and criticality of the upgrades), whereby the network appliance can determine whether the upgrade is needed (in accordance with local policies, for example). Other embodiments can use various combinations of the features listed above. If no upgrade is needed, then the method ends.

At block 316, a determination is made as to whether to upgrade the network appliance using a sequential series of upgrade patches or using a full install image. The full install image can contain, for example, the latest version of software that does not need an upgrade patch. Alternatively, the full install image can contain a version of software to which a series of upgrade patches can be safely applied. As discussed above, this determination on a possible upgrade path may be based on whether the network appliance software is too out-of-date use to safely upgrade using a sequential series of upgrade patches, or whether such upgrade patch exists for the network appliance, or some other factors.

Whether a series of upgrade packages can be safely applied to a particular version of software can be determined automatically by using an upgrade threshold. The upgrade threshold can be based on results of tests of applying upgrade patches of various revision levels, predetermined differences in revision dates, predetermined differences in version numbers, or combinations thereof. The determination can be made automatically by processing logic of the service provider or by processing logic of the network appliance by comparing the network appliance versioning information with the versioning information of available upgrades from the network service provider.

For example, a network appliance that has not been booted (and/or not connected to a network) in over two years (and thus needs upgrading) is booted and is connected to a network. The processing logic can make a determination that the network appliance is to be upgraded using a full install image upgrade because the network appliance has not been upgraded within a time of (for example) one year. The one-year mark can be a predetermined policy decision by which selections of upgrade methods are made. (The policy can be based on practical experience regarding the upgrading of network appliances and time periods beyond which network appliances would not be likely to be safely upgraded using a series of patches).

If it is determined that a network appliance can be safely upgraded using a series of upgrade patches, the method proceeds to block 318 where the network appliance is conventionally upgraded using a sequential series of upgrade patches. If it is determined that a series of upgrade patches cannot be safely applied to the network appliance, the method proceeds to block 322.

In another embodiment, the network appliance can be directed by the service provider to modify the boot routine of the network appliance such that if the application of a sequential series of upgrade patches fails (as applied in block 318), the processing logic can automatically resume at block 322 (described below) after a reboot.

At block 322, a full install image is downloaded and unpacked in the upgrade staging area. As discussed above, the full install image typically includes the latest revision of software (such as the operating system or application program) that does not require much, if any, upgrade patches (that can be applied to the full install image using a conventional upgrade method). The full install image is then used by the network appliance to reinstall the software (as described below using FIG. 3B).

At block 330, the service provider waits for the network appliance to successfully use the full install image to re-install the software on the network appliance. At block 332, the server provider is notified that the network appliance has been successfully upgraded. The notification may include an email notification or other electronic signal to a system administrator of the system. The service provide can, for example, use the information to update a table containing versioning information of the network appliance.

Figure 3B:
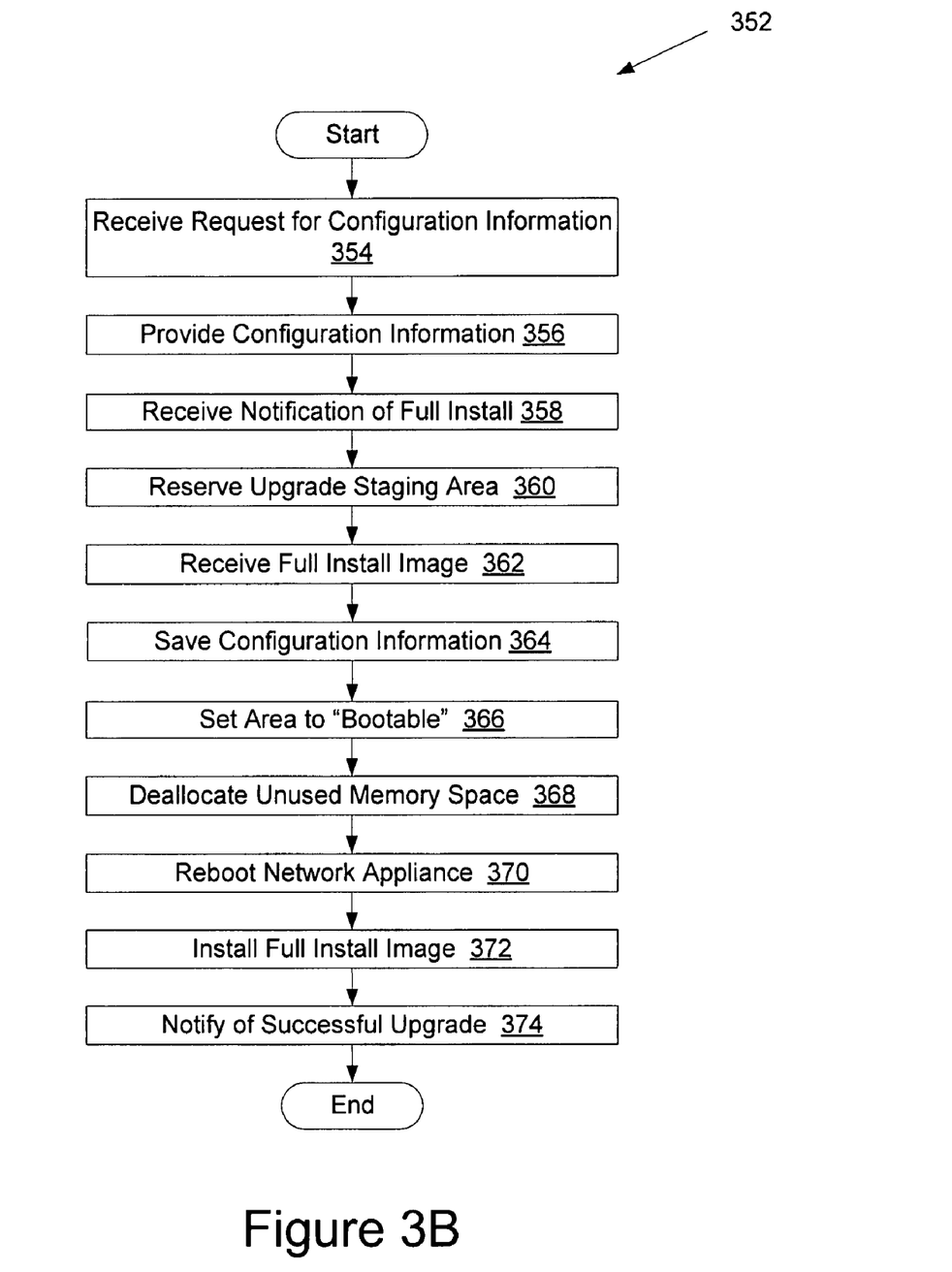
FIG. 3B is a flow diagram illustrating a method for activating a network appliance, in accordance with one embodiment of the present invention.

FIG. 3B is a flow diagram illustrating one embodiment of a client-based method 300 for upgrading a network appliance. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 352 is performed by a network appliance, such as network appliance 110 of FIG. 1A.

Referring to FIG. 3B, method 352 begins with receiving a request for configuration information (block 354). The request may ask for version information (such as version numbers or revision dates) of software on the network appliance. In response, the network appliance assembles the information and prepares a communication containing the information. At block 356, the configuration information is sent to the service provider, where the service provider uses the information (among other possible uses) to determine whether and how to upgrade the network appliance.

At block 358, the network appliance receives a notification of a full install from the service provider. At block 360, an upgrade staging area is reserved in a memory device, such as memory device 200 described above. For example, the upgrade staging area can use the reserved partition of a hard drive.

At block 362, the network appliance receives the full install image from the network appliance and saves and/or unpacks the information using the upgrade staging area. In an embodiment, the full install image is a collection of software packages in a preinstalled state that can be unpacked to create an executable image.

At block 364, critical configuration information is saved to the upgrade staging area. The critical configuration information includes information that is used locally by the network appliance to properly operate. The critical configuration information is not necessarily known by the service provider. The critical configuration information can include information such as the client certificate and key, and the local IP address of the scout device. Saving the critical configuration information allows the old operating system memory space (for example) to be wiped clean from the hard drive, as described below.

At block 366, the upgrade staging area is set as "bootable," and the network appliance rebooted such that the network appliance reboots using the full install image stored in the upgrade staging area. In another embodiment, the processor of the network appliance can be vectored to the full install image, for example, by a software interrupt or reset.

At block 368, the network appliance (operating using code from the full install image) erases (or de-allocates) all or some of the old information stored on, for example, the operating system partition of the disk. The stored configuration information is retrieved and associated with the full install image, so that the configuration information can be accessed by processes of the full install image.

In one embodiment, the full install image (and associated configuration information) is copied over the old information. In another embodiment, the full install image is left in the upgrade staging area (which can then be designated, for example, as a bootable partition as described below). In yet another embodiment the full install image can be copied to a third location, which can be made bootable.

At block 370, the full install image and associated configuration information is marked as bootable, and the network appliance is rebooted. Upon reboot, the processing logic can begin "cleanup" of memory space that is no longer needed by the upgrade full install image. After the cleanup of unused memory space, the processing logic can continue with normal operation. In another embodiment, one or more software packages are installed into the areas previously cleared or deallocated in block 368.

At block 372, the network appliance optionally notifies the service provider that the network appliance has been successfully upgraded. The notification may include an email notification or other electronic signal to a system administrator of the system.

Figure 4:
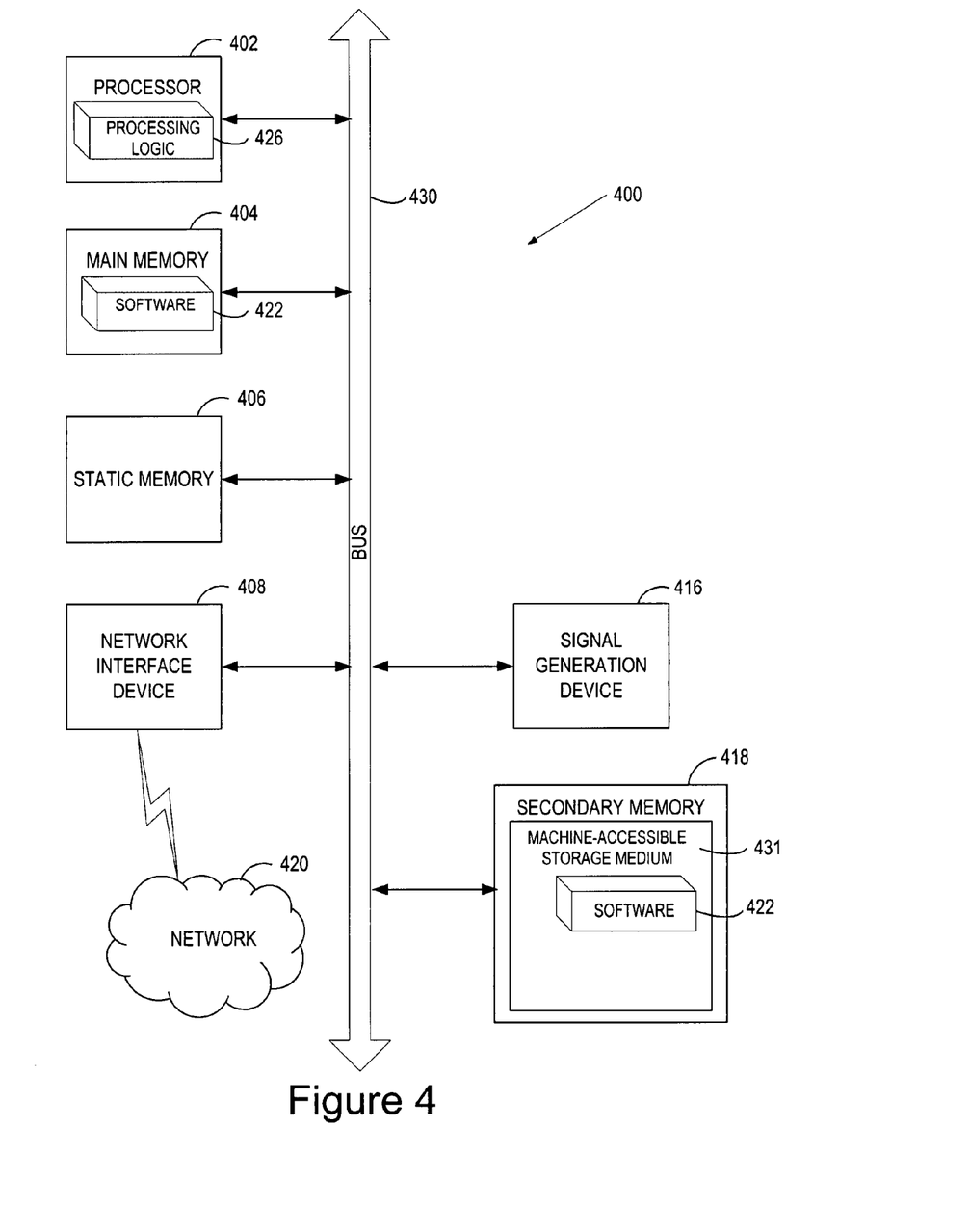
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server 115, a back end server 125, a client 105, a network appliance 110, or any other computing device.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), and a static memory 406 (e.g., flash memory, static random access memory (SRAM), etc.), which may communicate with each other via a bus 430. Alternatively, the processing device 402 may be connected to memory 404 and/or 406 directly or via some other connectivity means.

Processing device 402 represents one or more general-purpose processing devices such as a microprocessor, central processing unit, or the like. More particularly, the processing device 402 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 402 is configured to execute processing logic 426 for performing the operations and steps discussed herein.

The computer system 400 may further include a network interface device 408 and/or a signal generation device 416. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 400 may or may not include a secondary memory 418 (e.g., a data storage device) having a machine-accessible storage medium 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 431 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
   determining that an upgrade of a network appliance is to be performed using versioning information obtained from the network appliance and using upgrade versioning information;
   determining whether to upgrade the network appliance by using a full install image or by using one or more patches, wherein the determination is made automatically based on upgrade criteria comprising at least one of:
   (a) whether applying one or more patches will result in a safe upgrade of a particular version of the network appliance,
   (b) whether a number of revision levels between a current revision level obtained from the network appliance and a desired revision level exceeds a predefined threshold,
   (c) whether one or more patches are unavailable for a particular version of the network appliance, and
   (d) whether one or more previous attempts to upgrade one or more network appliances of a particular version using one or more patches were unsuccessful; and
   if the network appliance is to be upgraded using the full install image, downloading the full install image to the network appliance to upgrade the network appliance using the full install image.

2. The method of claim 1, wherein determining whether to upgrade the network appliance using the full install image comprises:
   comparing the network appliance versioning information with an upgrade threshold.

3. The method of claim 1, wherein determining whether to upgrade the network appliance using the full install image comprises:
   determining that an upgrade patch is unavailable for upgrading the network appliance to a later revision level.

4. The method of claim 1, wherein the versioning information comprises the revision dates of software installed in the network appliance.

5. The method of claim 1, further comprising, if the network appliance is not to be upgraded using the full install image, downloading a series of upgrade patches to the network appliance.

6. The method of claim 1, further comprising:
   storing the versioning information of software of the network appliance each time the network appliance is successfully upgraded.

7. The method of claim 1, further comprising:
   requesting the versioning information of software of the network appliance; and
   receiving the versioning information of software from the network appliance.

8. The method claim 1, wherein the full install image upgrade is automatically made by the network appliance after an unsuccessful upgrade of the network appliance using an upgrade patch.

9. The method of claim 1, wherein the full install image is downloaded to an upgrade staging area of the memory of the network appliance.

10. The method of claim 1, wherein a partition of a hard drive of a memory of the network appliance is used to store a download of the full install image and the partition is made bootable.

11. The method of claim 10, wherein the network appliance stores network appliance configuration information with the full install image, reboots from the full install image, and frees no-longer-used memory space on the network appliance after the rebooting from the full install image.

12. The method of claim 1, wherein the network appliance executes the full install image using hardware configuration information of the network appliance.

13. A non-transitory machine-accessible medium including instructions that, when executed by a first machine, cause the first machine to perform a computer implemented method comprising:
   determining that an upgrade of a network appliance is to be performed using versioning information obtained from the network appliance and using upgrade versioning information;
   determining whether to upgrade the network appliance using a full install image or by using one or more patches, wherein the determination is made automatically based on upgrade criteria comprising at least one of:
   (a) whether applying one or more patches will result in a safe upgrade of a particular version of the network appliance,
   (b) whether a number of revision levels between a current revision level obtained from the network appliance and a desired revision level exceeds a predefined threshold,
   (c) whether one or more patches are unavailable for a particular version of the network appliance, and
   (d) whether one or more previous attempts to upgrade one or more network appliances of a particular version using one or more patches were unsuccessful; and
   if the network appliance is to be upgraded using the full install image, downloading the full install image to the network appliance to upgrade the network appliance using the full install image.

14. The machine-accessible medium of claim 13, wherein the versioning information comprises the revision numbers of software installed in the network appliance.

15. The machine-accessible medium of claim 13, wherein the method further comprises receiving a notification of a successful upgrade.

16. The machine-accessible medium of claim 13, wherein the upgrade criteria comprises a time interval and versioning information.

17. The machine-accessible medium of claim 13, wherein the method further comprises polling a network appliance for the network appliance versioning information.

18. The machine-accessible medium of claim 13, wherein the method further comprises establishing a trusted session between a network service provider and the network appliance.

19. An apparatus, comprising:
   a memory having an image install repository to store a full install image of software upgrades for a network appliance;
   a processor, coupled to the memory; and
   an upgrade manager, executable from the memory by the processor, to determine that an upgrade of the network appliance is to be performed using versioning information obtained from the network appliance and using upgrade versioning information, to determine automatically whether to upgrade a network appliance by using the full install image or by using one or more patches, wherein the determination is made using upgrade criteria comprising at least one of:
   (a) whether applying one or more patches will result in a safe upgrade of a particular version of the network appliance,
   (b) whether a number of revision levels between a current revision level obtained from the network appliance and a desired revision level exceeds a predefined threshold,
   (c) whether one or more patches are unavailable for a particular version of the network appliance, and
   (d) whether one or more previous attempts to upgrade one or more network appliances of a particular version using one or more patches were unsuccessful, and
   wherein the full install image is downloaded to the network appliance to upgrade the network appliance using the full install image, in response to the determination that the network appliance is to be upgraded using the full install image.

20. The apparatus of claim 19, wherein the upgrade manager is to receive a notification of a successful upgrade by the network appliance.

21. The apparatus of claim 19, wherein the upgrade manager is to update a table for storing versioning information of the network appliance in response to a notification of a successful upgrade by the network appliance.

22. The apparatus of claim 19, further comprising an authentication component for establishing a trusted session with the network appliance.

* * * * *